United States Patent [19]

Pedersen

[11] Patent Number: 4,598,735

[45] Date of Patent: Jul. 8, 1986

[54] GUIDE VANE FOR A PRODUCT SWIVEL

[75] Inventor: Kristen I. Pedersen, Houston, Tex.

[73] Assignee: Sofec, Inc., Houston, Tex.

[21] Appl. No.: 674,150

[22] Filed: Nov. 23, 1984

[51] Int. Cl.$^4$ .............................................. F16L 27/06
[52] U.S. Cl. .................................. 137/615; 137/580;
285/190; 15/3.5; 15/104.06 R
[58] Field of Search ............... 285/190, 136; 137/580,
137/615, 875; 15/104.06 R, 3.5

[56] References Cited

U.S. PATENT DOCUMENTS

| | | | |
|---|---|---|---|
| 3,698,433 | 10/1972 | Dobler et al. | 285/190 |
| 3,866,628 | 2/1975 | Weber et al. | 137/875 |
| 4,174,127 | 11/1979 | Carn et al. | 285/190 |
| 4,183,559 | 1/1980 | Stafford et al. | 285/190 |
| 4,250,918 | 2/1981 | Tuson et al. | 137/580 |
| 4,391,298 | 7/1983 | Ortloff | 137/580 |
| 4,441,522 | 4/1984 | Griffin | 137/580 |

*Primary Examiner*—A. Michael Chambers
*Attorney, Agent, or Firm*—Dodge, Bush & Moseley

[57] ABSTRACT

A rotatable swivel adapted for assuring the passage of a scraper pig or a separator pig through a conveyance system of which and the swivel is a part is disclosed. The swivel includes a guide vane pivotally mounted in an inner ring of a swivel body to enable movement between a retracted position for assembling the inner ring with an outer ring and an operating position for insuring the passage of the pig from an inlet to an outlet communicating with a toroidally shaped conduit chamber of the rotatable swivel. A removable locking pin secures the guide vane in the operating position to assure the passage of the pig. A retracted position port and an operating position port are disposed in an outer ring of the swivel body to enable movement of the guide vane between the retracted and operating positions.

10 Claims, 7 Drawing Figures

GUIDE VANE FOR A PRODUCT SWIVEL

BACKGROUND OF THE INVENTION

1. Field of the Invention

This invention relates to a swivel adapted for transferring fluids. In particular, it relates to a product swivel adapted for assuring the passage of a pig through the swivel.

2. Description of the Prior Art

The offshore search for oil and gas has greatly expanded in recent years and progressed into deep, rough waters such as the North Sea. To facilitate production of oil and gas from remotely located offshore fields, complex tanker mooring systems which serve as centralized production sites for the entire field have been developed. Flexible fuel lines extend from a subsea location to the mooring site to permit the transfer of fluids between a moored tanker and a subsea location. For example, certain fluids lines may be used to convey oil and gas into the tanker, while other fluid lines may be used to inject liquids or gases back into the field for the purpose of well stimulation or storage.

Tankers will usually be moored to a single point mooring system which permits the vessel to weather vane and rotate 360 degrees about a single mooring point. To permit the tanker to rotate and move freely without causing twisting or entanglement of the various fluid lines to which the tanker is attached, it is necessary to provide a swivel mechanism to connect the fluid lines to the mooring site. Furthermore, since a plurality of fluid lines are involved, it is necessary that such a swivel have the capability of accommodating multiple lines.

The state of the art of product swivels and multi-line product swivels is illustrated in my co-pending patent application Ser. No. 635,922, "High Pressure Product Swivel" filed July 30, 1984 and is incorporated by reference into this application for all purposes. I am the sole inventor of both this application and the above referenced co-pending patent application.

The conveyance of oil, gas, and other well fluids often results in the formation of paraffin deposits and the accumulation of corrosion on the pipeline walls and the conduit chamber of the swivel. These accumulations and deposits reduce the efficiency of the conveyance system by increasing the impedance to fluid flow. In order to clean the pipeline walls and chamber of the swivel, a conventional ball or plug shaped scraper pig is passed under pressure through the conveyance system.

Also, in addition to a scraper pig, a separator pig may be used for separating different batches of product through a conveyance system incorporating the product swivel. It is to be understood that hereinafter a pig refers to either a scraper pig or a separator pig.

In prior art swivels, a pig passing through the conduit chamber of the swivel could become misrouted at a junction adjacent an inlet or an outlet of the swivel and could inadvertently become lodged in the junction. The pressurized fluid forcing the pig through the swivel could then by-pass the pig thereby preventing its proper passage from the inlet to the outlet of the swivel or, worse, the pig could severly restrict the flow of fluids in the conveyance system.

IDENTIFICATION OF THE OBJECTS OF THE INVENTION

It is therefore an object of this present invention to provide a swivel adapted for assuring the passage of a pig through the swivel.

It is another object of the invention to provide a guide vane in a product swivel for guiding a pig along a proper path for unobstructed passage through the swivel.

It is another object of the invention to provide a guide vane for a product swivel moveable between a retracted position for assembling the swivel body and an operating position for assuring the passage of the pig from the inlet to the outlet of the swivel.

It is another object of the invention to provide a guide vane for a product swivel to assure that adequate pressure can be developed behind the pig for forcing the pig through a conduit chamber of the swivel.

SUMMARY OF THE INVENTION

The objects identified above, as well as other advantages and features of the present invention are incorporated in a rotatable swivel comprising a swivel body having an inner ring and an outer ring. When the outer and inner rings are assembled, a toroidally shaped inner conduit chamber is formed. The inner ring is stationary and the outer ring is rotatably supported about the inner ring. The swivel body further comprises an inlet and an outlet which communicate with the toroidally shaped conduit chamber.

A guide vane, according to the invention, is pivotally mounted in the inner ring. The guide vane is moveable relative to the swivel body between a retracted position for assembling the inner ring within the outer ring and an operating position for assuring the passage of a pig from the inlet to the outlet in the toroidally shaped conduit chamber. The guide vane comprises an inwardly facing concave face cooperating with an inwardly facing concave inner conduit surface of the outer ring to assure passage of the pig into the outlet conduit when the guide vane is in the operating position.

According to the invention, a securing means is provided for fixedly securing the guide vane in the operating position comprising a locking pin bore disposed in the guide vane, a locking pin hole disposed in the inner ring, and a removeable locking pin insertable through the bore and the hole when they are axially aligned to secure the guide vane in the operating position.

According to a preferred embodiment of the invention, a retracted position port and an operating position port are disposed in the outer ring. The retracted position port is aligned with one end of the guide vane to allow a rod to be disposed through the port to pivot the guide vane to the retracted position. Similarly, a rod may be inserted through the operating position port aligned with the other end of the guide vane to pivot the guide vane to the operating position. Fluid tight plugs are removeably disposed in the ports.

According to the invention, a connecting means is provided for connecting a conduit or pipeline to the inner ring of the swivel. The guide vane is disposed in the inner ring adjacent this connection means to provide a tangential flow path transition from the toroidally shaped conduit chamber to the conduit.

BRIEF DESCRIPTION OF THE DRAWINGS

The objects, advantages, and features of the invention will become more apparent by reference to the drawings which are appended hereto and wherein like numerals indicate like parts and wherein an illustrated embodiment of the invention is shown, of which.

DETAILED DESCRIPTION OF THE INVENTION

Figure 1:
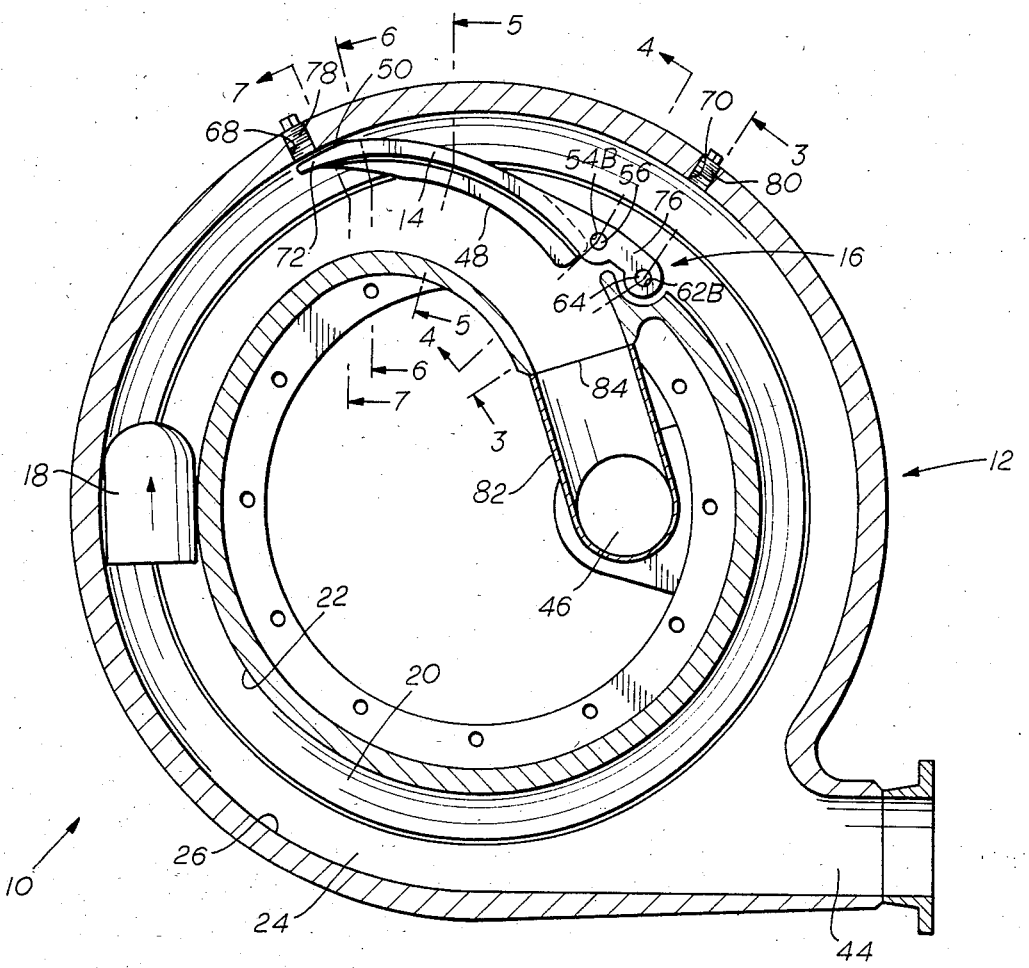
FIG. 1 is a plan view of the swivel of the present invention in the operating position.

The swivel 10 embodying the present invention is shown in detail in FIGS. 1-7. The swivel 10 comprises a swivel body 12, a guide vane 14, and a means for fixedly securing, generally designated 16, the guide vane 14 in the operating position for assuring the passage of a pig 18 through the swivel 10.

Figures 3, 4, 5, 6, 7:
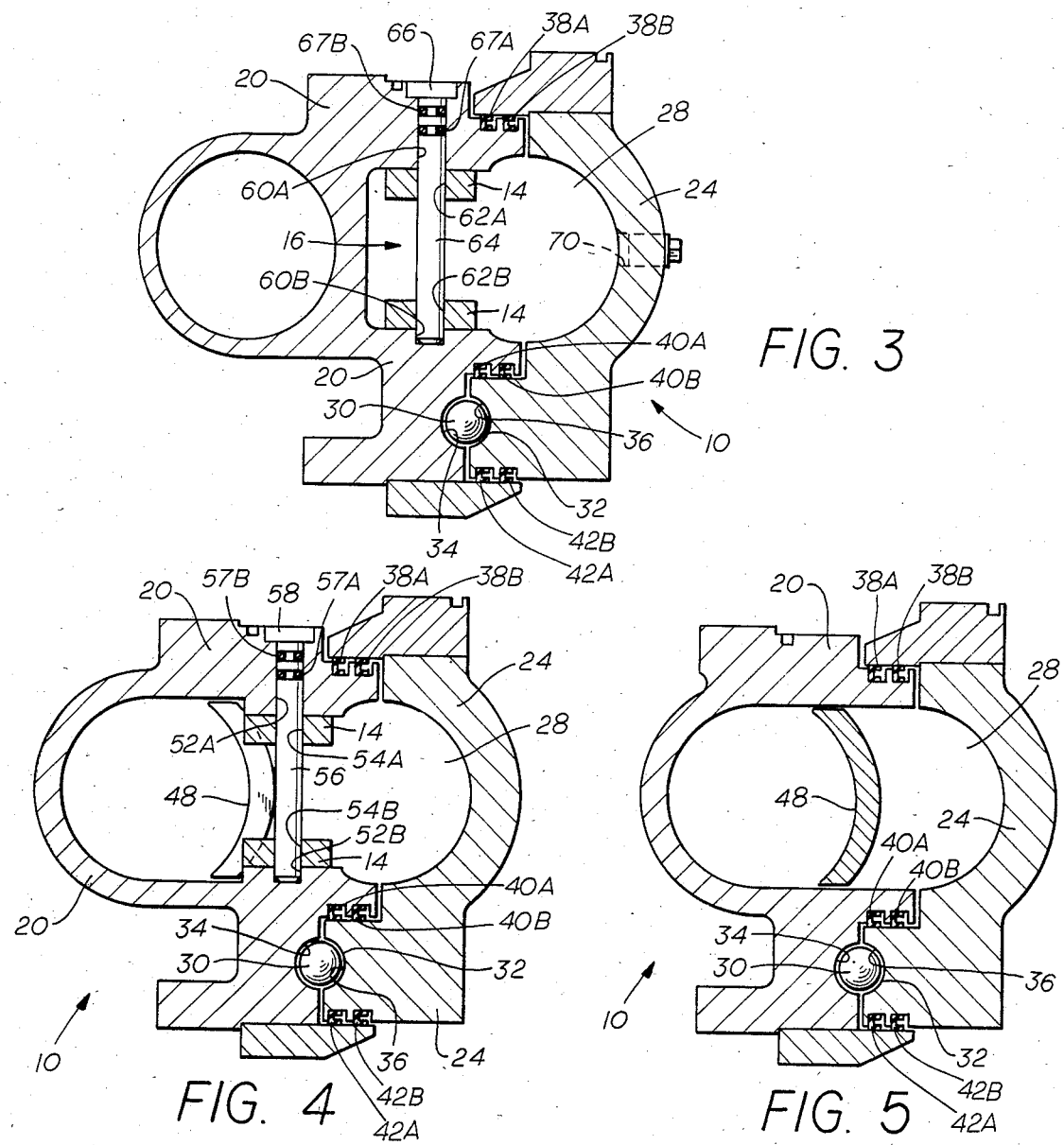
FIG. 3 is a sectional view taken along line 3—3 of FIG. 1.
FIG. 4 is a sectional view taken along line 4—4 of FIG. 1.
FIG. 5 is a sectional view taken along line 5—5 of FIG. 1.
FIG. 6 is a sectional view taken along line 6—6 of FIG. 1.
FIG. 7 is a sectional view taken along line 7—7 of FIG. 1.

The swivel body 12 has an inner ring 20 having an outwardly facing concave inner conduit surface 22 and an outer ring 24 having an inwardly facing concave inner conduit surface 26. The conduit surfaces 22 and 26 are in registration when the inner ring 20 is assembled within the outer ring 24 to form a toroidally shaped conduit chamber 28 as is best shown in FIGS. 3-7. In the preferred embodiment as illustrated in FIGS. 3-7, the inner ring 20 is rotatably supported radially and axially within the outer ring 24 by a ball bearing comprising a plurality of bearing balls 30 disposed in a toroidally shaped raceway chamber 32. The toroidally shaped raceway chamber 32 is formed by an outwardly facing concave raceway surface 34 of the inner ring 20 and the inwardly facing concave raceway surface 36 of the outer ring 24, as illustrated in FIG. 4. Upper face seals 38A and 38B, lower face seals 40A and 40B, and face seals 42A and 42B, as shown in FIG. 7, are provided in the swivel 10 as disclosed in my co-pending application Ser. No. 635,922, "High Pressure Product Swivel", filed on July 30, 1984, which is incorporated by reference into this application for all purposes.

Figure 2:
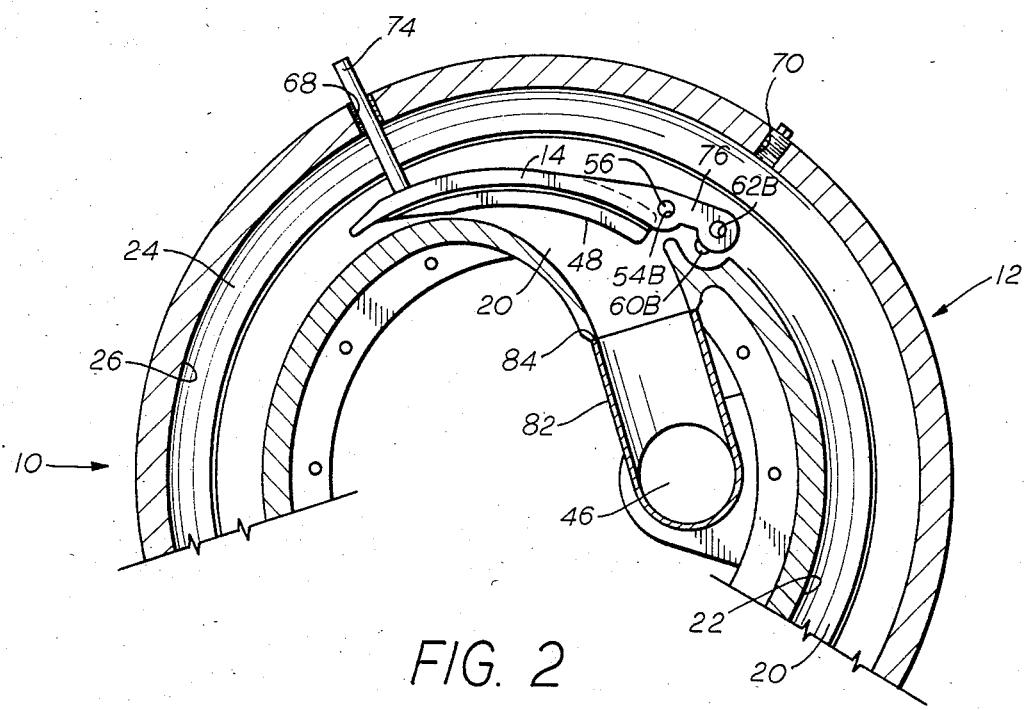
FIG. 2 is a fragmentary plan view of the swivel of the present invention in the retracted position.

For purposes of illustration, the preferred embodiment of the swivel body has an inlet 44 located on the exterior of the swivel 10, as shown in FIG. 1 and an outlet 46, as shown in FIGS. 1 and 2. The inlet 44 and the outlet 46 communicate with the toroidally shaped conduit chamber 28. Therefore, the flow of fluid and the passage of the pig 18 in the preferred embodiment travels counterclockwise with respect to the plan views of FIGS. 1 and 2. It is to be understood that the outlet could be located on the exterior or outer ring 24 of the swivel 10 and the outlet could be located in the interior or the inner ring 22 of the swivel 10. In the preferred embodiment, the inner ring 20 is stationary and the outer ring 24 is rotatable about the inner ring 20.

According to the invention, a guide vane 14 is pivotally mounted to the inner ring 20 for movement relative to the swivel body 12 between a retracted position (FIG. 2) for assembling the inner ring 20 within the outer ring 24 and an operating position (FIG. 1) for assuring the passage of the pig 18 from the inlet 44 to the outlet 46 in the toroidally shaped conduit chamber 28. The guide vane 14 comprises an inwardly facing concave face 48, as best shown in FIGS. 4-7. The face 48 cooperates with the inwardly facing concave inner conduit surface 26 of the outer ring 24, as best shown in FIGS. 1 and 7, to assure passage of the pig 18 when the guide vane 14 is in the operating position.

As shown in FIGS. 1 and 7, a gap 50 is provided between the guide vane 14 and the inwardly facing concave inner conduit surface 26 of the outer ring 24 so that the outer ring 24 may rotate freely about the inner ring 20.

As best shown in FIG. 4, pivot pin holes 52A and 52B are axially aligned in the inner ring 20. Pivot pin bores 54A and 54B are axially aligned in the guide vane 14. The bores 54A and 54B of guide vane 14 are axially aligned and interposed between pivot pin holes 52A and 52B to receive a pivot pin 56 inserted therein. The pivot pin 56 forms the axis on which the guide vane 14 retracts or pivots relative to the swivel body 12. O-ring seals 57A and 57B are disposed between the pivot pin 56 and the pivot hole 52A to prevent leakage of fluid from the conduit chamber. In the preferred embodiment, the inner ring 20 is provided with a pin cover plate 58 secured to the inner ring 20 over the hole 52A to prevent inadvertent withdrawal of the pin 56. In the preferred embodiment, socket head caps (not shown) are used to secure the pin cover plate 58 to the inner ring 20, but other conventional means could be used to secure the plate 58.

The means for fixedly securing, generally designated 16, the guide vane 14 with the swivel body 12 in the operating position (FIGS. 1 and 3) comprises locking pin holes 60A and 60B disposed in the inner ring 20, and locking pin bores 62A and 62B disposed in the guide vane 14. The locking pin bores 62A and 62B of guide vane 14 are axially aligned and interposed between the locking pin holes 60A and 60B of the inner ring 20 when the guide vane 14 is in the operating position. A removable locking pin 64 is inserted in the aligned bores 62 and holes 60 to secure the guide vane 14 in the operating position. O-ring seals 67A and 67B are disposed between the locking pin 64 and the locking pin hole 60A to prevent leakage of fluid from the conduit chamber. A pin cover plate 66 is secured to the inner ring 20, similar to plate 58, to prevent inadvertent withdrawal of the locking pin 64.

The invention further comprises a retracted position port 68 disposed in the outer ring 24, as is best shown in FIGS. 1, 2, and 7. The retracted position port 68 is shown by phantom lines in FIG. 7. An operating position port 70 disposed in the outer ring 24 is best shown in FIGS. 1, 2, and 3. The operating position port is shown by phantom lines in FIG. 3. The retracted position port 68 is aligned with outer end 72 of the guide vane 14. As best shown in FIG. 2, a rod 74 may be disposed through the retracted position port 68 to pivot the guide vane 14 to the retracted position.

Similarly, the operating position port 70 is aligned with the other end 76 of the guide vane 14. In the preferred embodiment, the other end 76 is located adjacent the locking pin bores 62 of the guide vane 14, as shown in FIGS. 1-3. A rod (not shown) similar to rod 74 may be disposed through the operating position port 70 to pivot the guide vane 14 to the operating position. Fluid tight plugs 78 and 80 are removably disposed in the retracted position port 68 and the operating position port 70, respectively.

A connecting conduit 82 is connected to the inner ring 20 of the swivel 10 by welding or other conventional means. The guide vane 14 is disposed in the inner ring adjacent the inner ring connection path 84 to provide a tangential flow path transition from the toroidally shaped conduit chamber 28 to the conduit 82.

Various modifications and alterations in the described structures will be apparent to those skilled in the art of the foregoing description which does not depart from the spirit of the invention. For this reason, these changes are desired to be included in the appended claims. The appended claims recite only the limitation to the present invention and the descriptive manner which is employed for setting forth the embodiments and is to be interpreted as illustrative and not limitative.

What is claimed is:

1. A swivel adapted for assuring the passage of a pig, comprising:
    a swivel body having,
        an inner ring having an outwardly facing concave inner conduit surface;
        an outer ring having an inwardly facing concave inner conduit surface;
        said conduit surfaces being in registration when said inner ring is assembled within said outer ring and forming a toroidally shaped conduit chamber;
    means for rotatingly supporting one ring with respect to the other ring;
    said swivel body having an inlet and an outlet communicating with said conduit chamber;
    a guide vane retractably mounted in said inner ring, said guide vane movable relative to said swivel body between a retracted position for assembling said inner ring within said outer ring and an operating position for assuring the passage of said pig from said inlet to said outlet in said toroidally shaped conduit chamber;
    means for fixedly securing said guide vane in the operating position; and
    a conduit disposed in said inner ring, said guide vane positioned adjacent said conduit to provide a tangential flow path transition between said conduit chamber and said conduit when said guide vane is in the operating position.

2. The apparatus of claim 1, wherein said inner ring is stationary and said outer ring is rotatable about said inner ring.

3. The apparatus of claim 1, wherein said guide vane is pivotally mounted to said inner ring.

4. The apparatus of claim 1, wherein said securing means comprises:
    a locking pin bore disposed in said guide vane,
    a locking pin hole disposed in said inner ring,
    said bore being axially aligned with said hole when said guide vane is in said operating position, and
    a removable locking pin insertable through said bore and said hole when axially aligned to secure said guide vane in the operating position.

5. The apparatus of claim 1, further comprising;
    a retracted position port and an operating position port disposed in said outer ring,
    said retracted position port aligned with one end of said guide vane whereby a rod may be disposed through said retracted position port to urge said vane to said retracted position, and
    said operating position port aligned with the other end of said guide vane whereby a rod may be disposed through said operating position port to urge said vane to said operating position.

6. The apparatus of claim 5, further comprising fluid tight plugs removably disposed in said retracted position port and said operating position port.

7. The apparatus of claim 1, further comprising:
    means for connecting said conduit to said inner ring.

8. A swivel adapted for assuring the passage of a pig, comprising:
    a swivel body having,
        an inner ring having an outwardly facing concave inner conduit surface;
        an outer ring having an inwardly facing concave inner conduit surface;
        said conduit surfaces being in registration when said inner ring is assembled within said outer ring and forming a toroidally shaped conduit chamber;
    means for rotatingly supporting one ring with respect to the other ring;
    said swivel body having an inlet and an outlet communicating with said conduit chamber;
    a guide vane retractably mounted in said inner ring, said guide vane movable relative to said swivel body between a retracted position for assembling said inner ring within said outer ring and an operating position for assuring the passage of said pig from said inlet to said outlet in said toroidally shaped conduit chamber;
    means for fixedly securing said guide vane in the operating position; and
    said guide vane includes
    an inwardly facing concave face cooperating with said inwardly facing concave conduit surface of said outer ring to assure passage of said pig when said guide vane is in said operating position.

9. A swivel adapted for assuring the passage of a pig, comprising:
    a swivel body having,
        an inner ring having an outwardly facing concave inner conduit surface;
        an outer ring having an inwardly facing concave inner conduit surface;
        said conduit surfaces being in registration when said inner ring is assembled within said outer ring and forming a toroidally shaped conduit chamber;
    means for rotatingly supporting one ring with respect to the other ring;
    said swivel body having an inlet conduit and an outlet conduit communicating with said conduit chamber;
    a guide vane retractably mounted in said inner ring, said guide vane movable relative to said swivel body between a retracted position for assembling said inner ring within said outer ring and an operating position for assuring the passage of said pig between said inlet conduit and said outlet conduit in said toroidally shaped conduit chamber;
    means for fixedly securing said guide vane in the operating position; and
    one of said conduits disposed in said inner ring, said guide vane having an inwardly facing concave face cooperating with said inwardly facing concave conduit surface, said guide vane concave face being positioned adjacent said inner ring conduit to provide a tangential flow path transition between said conduit chamber and said inner ring conduit when said guide vane is in the operating position.

10. The apparatus of claim 9, wherein said guide vane is pivotally mounted to said inner ring.

* * * * *